US007741251B2

(12) United States Patent
Eoff et al.

(10) Patent No.: US 7,741,251 B2
(45) Date of Patent: Jun. 22, 2010

(54) COMPOSITIONS AND METHODS OF STABILIZING SUBTERRANEAN FORMATIONS CONTAINING REACTIVE SHALES

(75) Inventors: Larry S. Eoff, Duncan, OK (US); B. Raghava Reddy, Duncan, OK (US); J. Michael Wilson, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 100 days.

(21) Appl. No.: 10/862,132

(22) Filed: Jun. 4, 2004

(65) Prior Publication Data

US 2004/0220058 A1 Nov. 4, 2004

Related U.S. Application Data

(63) Continuation-in-part of application No. 10/236,722, filed on Sep. 6, 2002, now Pat. No. 7,091,159, and a continuation-in-part of application No. 10/806,894, filed on Mar. 23, 2004.

(51) Int. Cl.
*C09K 8/588* (2006.01)
*C09K 8/88* (2006.01)
*C09K 8/90* (2006.01)

(52) U.S. Cl. .................. 507/240; 507/212; 507/213; 507/219; 507/239; 507/241; 507/244; 507/246; 507/247; 507/248; 507/252; 507/253; 507/254; 507/255; 507/256; 507/259; 507/260; 507/261; 507/267; 166/305.1; 166/306

(58) Field of Classification Search ...................... None
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,687,375 A | 8/1954 | Fischer et al. | |
| 2,689,244 A | 9/1954 | Jones | |
| 2,819,278 A * | 1/1958 | Jen-Pu et al. | 554/51 |
| 2,843,573 A | 7/1958 | Melamed | 526/260 |
| 2,863,832 A | 12/1958 | Perrine | 252/8.55 |
| 2,877,179 A * | 3/1959 | Hughes | 507/243 |
| 2,910,436 A | 10/1959 | Fatt et al. | 252/8.55 |
| 3,008,898 A * | 11/1961 | Hughes | 507/243 |
| 3,052,298 A | 9/1962 | Mallot | |
| 3,065,247 A * | 11/1962 | De Groote et al. | 554/51 |
| 3,138,205 A | 6/1964 | Kerver et al. | |
| 3,215,199 A | 11/1965 | Dilgren | 166/38 |
| 3,251,415 A | 5/1966 | Bombardieri et al. | 166/42 |
| 3,251,778 A * | 5/1966 | Dickson et al. | 134/22.19 |
| 3,258,428 A * | 6/1966 | Dickson et al. | 252/180 |
| 3,265,512 A * | 8/1966 | Dickson et al. | 106/14.15 |
| 3,271,307 A * | 9/1966 | Dickson et al. | 166/280.1 |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,347,789 A * | 10/1967 | Dickson et al. | 166/305.1 |
| 3,382,924 A | 5/1968 | Valey et al. | 166/42 |
| 3,404,114 A | 10/1968 | Walter et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhoune et al. | |
| 3,601,194 A | 8/1971 | Gallus | 166/283 |
| 3,615,794 A * | 10/1971 | Nimerick | 523/130 |
| 3,637,656 A | 1/1972 | Germino et al. | |
| 3,647,507 A | 3/1972 | Ashcraft | 427/288 |
| 3,647,567 A | 3/1972 | Schweri et al. | 428/463 |
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |

(Continued)

FOREIGN PATENT DOCUMENTS

EP 0 383 337 A2 8/1990

(Continued)

OTHER PUBLICATIONS

*Titanium Metals Corporation of America v. Banner*, 227 USPQ 773 (Fed. Cir. 1985).*

(Continued)

*Primary Examiner*—James Seidleck
*Assistant Examiner*—John J Figueroa
(74) *Attorney, Agent, or Firm*—Robert A. Kent

(57) ABSTRACT

The present invention relates to well bore stabilization and, more particularly, to treatment fluids that may reduce the tendency of shales to swell and associated methods. In some embodiments, the present invention provides a method of stabilizing a subterranean formation that comprises a shale, the method comprising contacting the subterranean formation that comprises the shale with a treatment fluid, the treatment fluid comprising a base fluid, and a hydrophobically modified polymer. In other embodiments, the treatment fluids comprise a base fluid and a hydrophilically modified polymer. In yet other embodiments, the present invention provides shale-inhibiting components, treatment fluids, and methods of reducing the tendency of shale to swell when exposed to a treatment fluid.

34 Claims, No Drawings

U.S. PATENT DOCUMENTS

| | | | |
|---|---|---|---|
| 3,818,991 A | 6/1974 | Nimerick | |
| 3,902,557 A | 9/1975 | Shaughnessy et al. | |
| 3,910,862 A | 10/1975 | Barabas et al. | 260/79.3 |
| 3,943,060 A | 3/1976 | Martin et al. | |
| 3,983,941 A | 10/1976 | Fitch | |
| 4,029,544 A | 6/1977 | Jarowenko et al. | |
| 4,052,343 A | 10/1977 | Cunningham | 521/32 |
| 4,052,345 A | 10/1977 | Austin et al. | 521/129 |
| 4,129,183 A | 12/1978 | Kalfoglou | 166/300 |
| 4,129,534 A | 12/1978 | Cunningham | 521/38 |
| 4,142,595 A * | 3/1979 | Anderson et al. | 175/72 |
| 4,152,274 A | 5/1979 | Phillips et al. | 876/296 |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A | 12/1981 | Blair, Jr. | |
| 4,337,828 A | 7/1982 | Blair, Jr. | |
| 4,366,071 A | 12/1982 | McLaughlin et al. | 252/8.55 |
| 4,366,072 A | 12/1982 | McLaughlin et al. | 252/8.55 |
| 4,366,073 A | 12/1982 | McLaughlin et al. | 252/8.55 |
| 4,366,074 A | 12/1982 | McLaughlin et al. | 252/8.55 |
| 4,374,739 A | 2/1983 | McLaughlin et al. | 252/8.55 |
| 4,393,939 A | 7/1983 | Smith et al. | 166/293 |
| 4,395,340 A | 7/1983 | McLaughlin | 252/8.55 |
| 4,401,789 A | 8/1983 | Gideon | 524/827 |
| 4,409,110 A | 10/1983 | Borchardt et al. | |
| 4,439,334 A | 3/1984 | Borchardt | 252/8.55 |
| 4,440,649 A | 4/1984 | Loftin et al. | 252/8.5 |
| 4,441,556 A | 4/1984 | Powers et al. | |
| 4,447,342 A | 5/1984 | Borchardt et al. | 252/8.55 |
| 4,460,627 A | 7/1984 | Weaver et al. | 427/212 |
| 4,462,718 A | 7/1984 | McLaughlin et al. | 405/264 |
| 4,499,214 A | 2/1985 | Sortwell | |
| 4,532,052 A | 7/1985 | Weaver et al. | 252/8.55 R |
| 4,536,297 A | 8/1985 | Loftin et al. | 252/8.5 |
| 4,536,303 A | 8/1985 | Borchardt | 252/8.55 R |
| 4,536,305 A | 8/1985 | Borchardt et al. | 252/8.55 |
| 4,552,670 A | 11/1985 | Lipowski et al. | 704/553 |
| 4,554,081 A | 11/1985 | Borchardt et al. | 252/8.5 |
| 4,563,292 A | 1/1986 | Borchardt | 252/8.55 |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,627,926 A | 12/1986 | Peiffer et al. | 252/8.55 |
| 4,631,138 A * | 12/1986 | Johns et al. | 507/243 |
| 4,662,448 A | 5/1987 | Ashford et al. | |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,702,319 A * | 10/1987 | Bock et al. | 166/275 |
| 4,730,028 A | 3/1988 | Bock et al. | 526/225 |
| 4,814,096 A | 3/1989 | Evani | 252/8.554 |
| 4,828,725 A * | 5/1989 | Lai et al. | 507/221 |
| 4,828,726 A | 5/1989 | Himes et al. | 252/8.553 |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | 526/287 |
| 4,960,876 A | 10/1990 | Molteni et al. | |
| 4,993,448 A * | 2/1991 | Karydas et al. | 137/13 |
| 5,051,197 A | 9/1991 | Kalfayan et al. | |
| 5,071,934 A | 12/1991 | Peiffer | 526/307 |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A | 9/1993 | Hale et al. | |
| 5,256,651 A * | 10/1993 | Phelps et al. | 514/53 |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,407,909 A * | 4/1995 | Goodhue et al. | 507/118 |
| 5,424,284 A * | 6/1995 | Patel et al. | 507/129 |
| 5,445,223 A | 8/1995 | Nelson et al. | |
| 5,473,059 A | 12/1995 | Yeh | |
| 5,482,116 A | 1/1996 | El-Rabaa et al. | |
| 5,566,760 A | 10/1996 | Harris | |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,643,460 A | 7/1997 | Marble et al. | |
| 5,646,093 A | 7/1997 | Dino | 507/209 |
| 5,663,123 A * | 9/1997 | Goodhue et al. | 507/225 |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,887,653 A | 3/1999 | Bishop et al. | 166/281 |
| 5,908,814 A * | 6/1999 | Patel et al. | 507/131 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A * | 2/2000 | Dymond | 507/120 |
| 6,047,773 A | 4/2000 | Zeltmann et al. | |
| 6,070,664 A | 6/2000 | Dalrymple et al. | 166/281 |
| 6,124,245 A | 9/2000 | Patel | 507/120 |
| 6,162,766 A | 12/2000 | Muir et al. | |
| 6,187,839 B1 | 2/2001 | Eoff et al. | 523/130 |
| 6,194,356 B1 | 2/2001 | Jones et al. | |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 | 6/2001 | Goodhue, Jr. et al. | |
| 6,253,851 B1 | 7/2001 | Schroeder, Jr. et al. | 166/278 |
| 6,277,900 B1 | 8/2001 | Oswald et al. | 523/130 |
| 6,281,172 B1 * | 8/2001 | Warren et al. | 507/110 |
| 6,283,210 B1 | 9/2001 | Soliman et al. | 166/270 |
| 6,291,404 B2 * | 9/2001 | House | 507/110 |
| 6,358,889 B2 * | 3/2002 | Waggenspack et al. | 507/110 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,454,003 B1 * | 9/2002 | Chang et al. | 166/270 |
| 6,476,169 B1 | 11/2002 | Eoff et al. | 523/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,520,255 B2 | 2/2003 | Tolman et al. | |
| 6,562,762 B2 | 5/2003 | Cowan et al. | |
| 6,569,983 B1 | 5/2003 | Treybig et al. | 528/102 |
| 6,601,648 B2 | 8/2003 | Ebinger | |
| 6,607,035 B1 | 8/2003 | Reddy et al. | |
| 6,609,578 B2 | 8/2003 | Patel et al. | 175/64 |
| 6,626,241 B2 | 9/2003 | Nguyen | |
| 6,627,719 B2 | 9/2003 | Whipple et al. | 774/325 |
| 6,637,517 B2 | 10/2003 | Samuel et al. | |
| 6,656,885 B2 | 12/2003 | House et al. | |
| 6,662,874 B2 | 12/2003 | Surjaatmadja et al. | |
| 6,702,044 B2 * | 3/2004 | Reddy et al. | 175/64 |
| 6,710,107 B2 | 3/2004 | Audibert et al. | 524/5 |
| 6,723,683 B2 | 4/2004 | Crossman et al. | |
| 6,743,288 B2 | 6/2004 | Eoff et al. | 106/724 |
| 6,756,345 B2 | 6/2004 | Pakulski et al. | |
| 6,764,981 B1 | 7/2004 | Eoff et al. | |

| | | | |
|---|---|---|---|
| 6,767,867 B2 | 7/2004 | Chatterji et al. | 507/216 |
| 6,767,869 B2 | 7/2004 | DiLullo et al. | |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,800,593 B2 | 10/2004 | Dobson, Jr. et al. | |
| 6,803,348 B2 | 10/2004 | Jones et al. | 507/221 |
| 6,846,420 B2 | 1/2005 | Reddy et al. | |
| 6,855,672 B2 | 2/2005 | Poelker et al. | 507/225 |
| 6,884,760 B1 | 4/2005 | Brand et al. | |
| 6,913,081 B2 | 7/2005 | Powell et al. | |
| 6,933,381 B2 | 8/2005 | Mallon et al. | |
| 6,962,203 B2 | 11/2005 | Funchess | |
| 6,978,836 B2 | 12/2005 | Nguyen et al. | |
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 | 5/2006 | Nguyen | |
| 7,081,439 B2 * | 7/2006 | Sullivan et al. | 507/269 |
| 7,087,554 B2 * | 8/2006 | Youngson et al. | 507/123 |
| 7,091,159 B2 | 8/2006 | Eoff et al. | |
| 7,114,568 B2 | 10/2006 | Eoff et al. | |
| 7,117,942 B2 | 10/2006 | Dalrymple et al. | |
| 7,159,656 B2 | 1/2007 | Eoff et al. | |
| 7,178,610 B2 * | 2/2007 | Bell | 175/72 |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,398,825 B2 | 7/2008 | Nguyen et al. | |
| 7,427,583 B2 * | 9/2008 | Couillet et al. | 507/211 |
| 2002/0123433 A1 | 9/2002 | Goodhue, Jr. et al. | |
| 2003/0013871 A1 * | 1/2003 | Mallon et al. | 536/84 |
| 2003/0019627 A1 | 1/2003 | Qu et al. | 166/281 |
| 2003/0104948 A1 | 6/2003 | Poelker et al. | 507/100 |
| 2003/0191030 A1 | 10/2003 | Blair et al. | 507/225 |
| 2004/0102331 A1 | 5/2004 | Chan et al. | 507/100 |
| 2004/0171495 A1 | 9/2004 | Zamora et al. | |
| 2004/0229756 A1 | 11/2004 | Eoff et al. | |
| 2004/0229758 A1 | 11/2004 | Eoff et al. | |
| 2005/0000694 A1 | 1/2005 | Dalrymple et al. | |
| 2005/0155796 A1 | 7/2005 | Eoff et al. | |
| 2005/0164894 A1 | 7/2005 | Eoff et al. | |
| 2005/0178549 A1 | 8/2005 | Eoff et al. | |
| 2005/0199396 A1 | 9/2005 | Sierra et al. | |
| 2005/0230114 A1 | 10/2005 | Eoff et al. | |
| 2005/0230116 A1 | 10/2005 | Eoff et al. | |
| 2005/0279502 A1 | 12/2005 | Eoff et al. | |
| 2005/0284632 A1 | 12/2005 | Dalrymple et al. | |
| 2007/0012445 A1 | 1/2007 | Nguyen et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |

FOREIGN PATENT DOCUMENTS

| | | |
|---|---|---|
| EP | 0 896 122 A2 | 2/1999 |
| EP | 1 193 365 A1 | 4/2002 |
| EP | 1 312 753 A1 | 5/2003 |
| GB | 2221940 A | 2/1990 |
| GB | 2335428 A | 9/1999 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 A | 3/2004 |
| WO | WO 2004/022667 A1 | 3/2004 |
| WO | WO 2004/094781 | 11/2004 |
| WO | WO 2004/101706 A1 | 11/2004 |

OTHER PUBLICATIONS

Definition of "Shale", Schlumberger Oil Field Glossary Web-Dictionary, Schlumberger Oil Co., 2009, p. 1.*
U.S. Appl. No. 10/236,722, filed Sep. 6, 2002, Eoff, et al.
Paper Entitled "Controlling Formation Damage Using Clay Stabilizers: A Review", by Z. J. Zhou et al., 1995.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf, Abstract only.
Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf, Abstract only.
Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Information*, Aug. 1, 2001, pp. 1-2.
BJ Services Company, *Aquatrol I, Product Information*, Dec. 14, 2000, pp. 1-2.
Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).
Xu, et al.., Modeling of Laser Spallation Drilling of Rocks for Gas- And Oilwell Drilling, SPE 95746, 2005.
Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker, et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability for Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester With Transient, Harmonic, and Pulsed Time-Delay Testing Methods Determines Permeability, Skin and Anisotropy, SPE 64650, 2000.

Office Action mailed May 22, 2008 from U.S. Appl. No. 11/102,062.
Office Action mailed Jun. 13, 2008 from U.S. Appl. No. 10/806,894.
Office Action from U.S. Appl. No. 11/485,199 mailed Sep. 24, 2008.
Office Action from U.S. Appl. No. 10/440,337 mailed Sep. 25, 2008.
Office Action from U.S. Appl. No. 11/102,062 mailed Sep. 23, 2008.
Office Action from U.S. Appl. No. 11/501,595 mailed Sep. 24, 2008.
Office Action for U.S. Appl. No. 11/360,215 dated Sep. 17, 2008.
Office Action mailed Nov. 17, 2008, for U.S. Appl. No. 11/471,148.
Office Action mailed Nov. 18, 2008, for U.S. Appl. No. 11/122,836.
Office Action mailed Nov. 18, 2008, for U.S. Appl. No. 11/471,738.
Office Action for U.S. Appl. No. 10/806,894, mailed Dec. 17, 2008.
Office Action for U.S. Appl. No. 10/760,443, mailed Dec. 23, 2008.
Office Action for U.S. Appl. No. 11/360,215, dated Apr. 28, 2009.
Office Action for U.S. Appl. No. 11/485,199, dated Apr. 28, 2009.
Office Action for U.S. Appl. No. 11/122,836, dated May 13, 2009.
Notice of Allowance and Notice of Allowability for U.S. Appl. No. 11/471,148, dated May 20, 2009.
Office Action for U.S. Appl. No. 11/102,062, dated Nov. 12, 2009.
Office Action for U.S. Appl. No. 11/485,199, dated Nov. 18, 2009.
Office Action for U.S. Appl. No. 11/360,215, dated Dec. 7, 2009.
Office Action for U.S. Appl. No. 11/501,595 dated Feb. 5, 2010.
Office Action for U.S. Appl. No. 11/122,836 dated Feb. 22, 2010.
Office Action for U.S. Appl. No. 11/102,062 dated Feb. 24, 2010.
Office action dated Jul. 3, 2006 from U.S. Appl. No. 10/806,894.
Notice of allowance dated Jan. 28, 2008 from U.S. Appl. No. 11/102,062.
Office action dated Jun. 27, 2007 from U.S. Appl. No. 11/102,062.
Office action dated May 1, 2007 from U.S. Appl. No. 11/122,836.
Office action dated Nov. 14, 2007 from U.S. Appl. No. 11/122,836.
Office action dated Feb. 1, 2008 from U.S. Appl. No. 10/440,337.
Office action dated Nov. 15, 2006 from U.S. Appl. No. 10/440,337.
Office action dated May 3, 2006 from U.S. Appl. No. 10/440,337.
Notice of allowance dated Mar. 23, 2006 from U.S. Appl. No. 10/236,722.
Office action dated Sep. 28, 2005 from U.S. Appl. No. 10/236,722.
Office action dated Jul. 5, 2005 from U.S. Appl. No. 10/236,722.
Office action dated Apr. 19, 2005 from U.S. Appl. No. 10/236,722.
Office action dated Oct. 20, 2004 from U.S. Appl. No. 10/236,722.
Notice of allowance dated Mar. 23, 2006 from U.S. Appl. No. 10/612,271.
Notice of allowance dated Jul. 18, 2006 from U.S. Appl. No. 10/825,001.
Office action dated Jan. 6, 2006 from U.S. Appl. No. 10/825,001.
Notice of allowance dated Aug. 17, 2006 from U.S. Appl. No. 10/881,198.
Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210.
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Nov. 16, 2007 from U.S. Appl. No. 10/760,443.
Office action dated Aug. 8, 2007 from U.S. Appl. No. 10/760,443.
Office action dated Feb. 21, 2007 from U.S. Appl. No. 10/760,443.
Office action dated Oct. 6, 2006 from U.S. Appl. No. 10/760,443.
Office action dated Mar. 23, 2006 from U.S. Appl. No. 10/760,443.
Office action dated Dec. 28, 2007 from U.S. Appl. No. 10/806,894.
Office action dated Jul. 12, 2007 from U.S. Appl. No. 10/806,894.
Office action dated Apr. 9, 2007 from U.S. Appl. No. 10/806,894.
Office action dated Jan. 3, 2007 from U.S. Appl. No. 10/806,894.
Notice of Allowance for U.S. Appl. No. 10/760,443 dated Feb. 8, 2010.
Office Action for U.S. Appl. No. 10/806,894 dated Apr. 1, 2010.

* cited by examiner

COMPOSITIONS AND METHODS OF STABILIZING SUBTERRANEAN FORMATIONS CONTAINING REACTIVE SHALES

CROSS-REFERENCE TO RELATED APPLICATIONS

This application is a continuation-in-part of U.S. application Ser. No. 10/236,722 entitled "Compositions for and Methods of Stabilizing Subterranean Formations Containing Clays," filed on Sep. 6, 2002, now U.S. Pat. No. 7,091,159 and U.S. application Ser. No. 10/806,894 entitled "Permeability-Modifying Drilling fluids and Methods of Use," filed on Mar. 23, 2004.

BACKGROUND

The present invention relates to well bore stabilization and, more particularly, to treatment fluids that may reduce the tendency of shales to swell and associated methods.

A treatment fluid may be used in a subterranean formation in a variety of ways. For example, a fluid may be used to drill a well bore in a subterranean formation, to stimulate a well bore in a subterranean formation, or to complete a well bore in a subterranean formation, as well as or for a number of other purposes. The process of drilling a well typically requires the use of a drilling fluid. A drilling fluid used in connection with drilling a well in a subterranean formation may comprise a number of fluids (gaseous or liquid) and mixtures of fluids and solids (e.g., as solid suspensions, mixtures and/or emulsions of liquids, gases and solids) used in operations to drill well bores into subterranean formations. Drilling fluids are used, inter alia, to cool the drill bit, to lubricate the rotating drill pipe to prevent it from sticking to the walls of the well bore, to prevent blowouts by serving as a hydrostatic head to counteract the sudden entrance into the well bore of high pressure formation fluids, and to remove drill cuttings from the well bore.

During the drilling of subterranean well bores, it is not uncommon to encounter strata comprising shales. As referred to herein, the term "shale" will be understood to mean materials such as certain types of clays (e.g., bentonite) and related subterranean materials that may "swell," or increase in volume, when exposed to water. The shale may be problematic during drilling operations because, inter alia, of its tendency to swell when exposed to aqueous media, such as aqueous-based drilling fluids. Shale swelling may result in undesirable drilling conditions and undesirable interference with the drilling fluid. The increase in bulk volume of the shale associated with shale swelling may impede the removal of drill cuttings from beneath the drill bit, increase the friction between the drill string and the sides of the well bore, and inhibit the formation of a desirable filter cake on the formation. Shale swelling also may result in other problems, such as the loss of drilling fluid circulation or stuck pipe that may result in undesirable delays and expenses. Furthermore, shale swelling also may substantially decrease the stability of the well bore, which may cause irregularities in the diameter of the well bore, e.g., the diameter of some portions of the well bore may be either smaller or greater than optimally desired. In an extreme case, shale swelling may decrease the stability of the well bore to such an extent that the well bore may collapse.

A traditional method of inhibiting shale degradation during drilling has been to use an oil-based drilling fluid as opposed to an aqueous-based drilling fluid. However, environmental regulations enacted by numerous countries have limited the use of oil-based drilling fluids. Other attempts to counteract the problems associated with shale degradation during drilling have been to include shale-inhibiting components in an aqueous-based drilling fluid. As used herein, a "shale-inhibiting component" refers to a compound that demonstrates a propensity for inhibiting the tendency of shales to swell by absorbing water. Salts, such as potassium chloride, are one example of a conventional shale-inhibiting component. While salts may reduce the tendency of shales to swell, they also may flocculate the shale, resulting in undesirable fluid loss and a loss of thixotropy. Furthermore, an increase in salinity may result in a decrease in the functional characteristics of drilling fluid additives. Other examples of conventional shale-inhibiting components include, but are not limited to, amphoteric materials, polyglycols, partially hydrolyzed polyacrylamides, combinations of thickeners such as a copolymer and a polysaccharide, and polymers with a hydrophilic group and a hydrophobic group. However, these conventional shale-inhibiting components may not provide a desired level of shale swelling inhibition and/or may be environmentally undesirable in certain regions of the world.

SUMMARY

The present invention relates to well bore stabilization and, more particularly, to treatment fluids that may reduce the tendency of shales to swell and associated methods.

In some embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer that comprises a polymer backbone, the polymer backbone comprising polar heteroatoms, wherein the hydrophobically modified polymer does not comprise polyoxyethylene.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from a reaction of a hydrophilic polymer and a hydrophobic compound, wherein the hydrophilic polymer comprises a polyvinylamine, or a poly(vinylamine/vinyl alcohol).

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from a reaction of a hydrophilic polymer and a hydrophobic compound, wherein the hydrophilic polymer comprises a polymer backbone and contains reactive amino groups as pendant groups or in the polymer backbone.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from the polymerization reaction of at least one hydrophilic monomer and at least one hydrophobically modified hydrophilic monomer, wherein the hydrophilic monomer comprises N,N-dimethylacrylamide; vinyl pyrrolidone; dimethylaminoethyl methacrylate; dimethylaminopropylmethacrylamide; vinyl amine; vinyl acetate; trimethylammoniumethyl methacrylate chloride; hydroxyethyl acrylate; vinyl sulfonic acid; vinyl phosphonic acid; vinyl caprolactam; N-vinylformamide; N,N-diallylacetamide; dimethyldiallyl ammonium halide; styrene sulfonic acid; or a quaternary salt derivative of acrylamide.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophilically modified polymer.

In yet other embodiments, the present invention provides a shale-inhibiting component that comprises a hydrophobically modified polymer that comprises a polymer backbone, the polymer backbone comprising polar heteroatoms, wherein the hydrophobically modified polymer does not comprise polyoxyethylene.

In other embodiments, the present invention provides a shale-inhibiting component that comprises a hydrophobically modified polymer formed from a reaction of a hydrophilic polymer and a hydrophobic compound, wherein the hydrophilic polymer comprises a polyvinylamine, or a poly(vinylamine/vinyl alcohol).

In other embodiments, the present invention provides a shale-inhibiting component that comprises a hydrophobically modified polymer formed from a reaction of a hydrophilic polymer and a hydrophobic compound, wherein the hydrophilic polymer comprises a polymer backbone and contains reactive amino groups as pendant groups or in the polymer backbone.

In other embodiments, the present invention provides a shale-inhibiting component that comprises a hydrophobically modified polymer formed from the polymerization reaction of at least one hydrophilic monomer and at least one hydrophobically modified hydrophilic monomer, wherein the hydrophilic monomer comprises N,N-dimethylacrylamide; vinyl pyrrolidone; dimethylaminoethyl methacrylate; dimethylaminopropylmethacrylamide; vinyl amine; vinyl acetate; trimethylammoniumethyl methacrylate chloride; hydroxyethyl acrylate; vinyl sulfonic acid; vinyl phosphonic acid; vinyl caprolactam; N-vinylformamide; N,N-diallylacetamide; dimethyldiallyl ammonium halide; styrene sulfonic acid; or a quaternary salt derivative of acrylamide.

In other embodiments, the present invention provides a shale-inhibiting component that comprises a hydrophilically modified polymer.

The features and advantages of the present invention will be readily apparent to those skilled in the art upon a reading of the detailed description, which follows.

DETAILED DESCRIPTION

The present invention relates to well bore stabilization and, more particularly, to treatment fluids that may reduce the tendency of shales to swell and associated methods. While the methods of the present invention are useful in conjunction with a wide variety of treatment fluids (e.g., drilling fluids, completion fluids, stimulation fluids, and remedial fluids, and the like) when it is desired to stabilize the subterranean formation (e.g., by controlling the tendency of shale to swell), they are particularly useful with drilling fluids.

In some embodiments, the treatment fluids of the present invention generally comprise a base fluid and a hydrophobically modified polymer. As used herein, "hydrophobically modified" refers to the incorporation into the hydrophilic polymer structure of hydrophobic groups, wherein the alkyl chain length is from about 4 to about 22 carbons. Other additives suitable for use in treatment fluids may be added to the treatment fluids of the present invention as desired. In other embodiments, the treatment fluids of the present invention generally comprise a base fluid and a hydrophilically modified polymer. As used herein, "hydrophilically modified" refers to the incorporation into the hydrophilic polymer structure of hydrophilic groups. Among other things, the hydrophobically modified polymers and hydrophilically modified polymers of the present invention may stabilize subterranean formations containing shale, inter alia, by inhibiting the tendency of shales to swell by absorbing water.

The base fluid utilized in the treatment fluids of the present invention may be aqueous-based, or oil-based, or mixtures thereof. Where the base fluid is aqueous-based, the water utilized may be fresh water, saltwater (e.g., water containing one or more salts dissolved therein), brine (e.g., saturated saltwater), or seawater. Generally, the water may be from any source, provided that it does not contain an excess of compounds that may adversely affect other components in the drilling fluid. Where the base fluid is oil-based, examples of suitable oils include, but are not limited to, mineral oils, synthetic oils, esters, and the like. Generally, any oil that can be emulsified is suitable for use as a base fluid in the treatment fluids of the present invention. It is understood that where oil-based treatment fluids (e.g., oil-based drilling fluids) are used in the present invention, such oil-based treatment fluids may comprise an emulsified aqueous phase. The emulsification of the aqueous phase allows the water-soluble shale-inhibiting component to be incorporated into the oil-based treatment fluids without or with limited undesirable interactions between the aqueous phase and the water-soluble shale-inhibiting component.

In some embodiments, the treatment fluids of the present invention comprise a hydrophobically modified polymer. In some embodiments, the shale-inhibiting components of the present invention comprise a hydrophobically modified polymer. The hydrophobically modified polymers of the present invention typically have a molecular weight in the range of from about 100,000 to about 10,000,000. In some embodiments, the hydrophobically modified polymers are water-soluble. As used herein, "water-soluble" refers to at least 0.01 weight percent soluble in distilled water. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In an exemplary embodiment, the hydrophobically modified polymers may comprise a polymer backbone, the polymer backbone comprising polar heteroatoms, wherein the hydrophobically modified polymer does not comprise polyoxyethylene. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(acrylamide/dimethylaminopropyl methacrylamide), poly(2-acrylamido-2-methyl propane sulfonic acid/dimethylaminoethyl methacrylate), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In certain exemplary embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, and starches, and derivatives thereof. In an exemplary embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In other exemplary embodiments, the hydrophobically modified polymers used in the present invention may be prepared from the polymerization reaction of at least one hydrophilic monomer and at least one hydrophobically modified hydrophilic monomer. Examples of suitable methods of their preparation are described in U.S. Pat. No. 6,476,169, the relevant disclosure of which is incorporated herein by reference.

A variety of hydrophilic monomers may be used to form the hydrophobically modified polymers useful in the present invention. Examples of suitable hydrophilic monomers include, but are not limited to homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In an exemplary embodiment, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylate.

The hydrophobically modified polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10. Suitable hydrophobically modified polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer.

In some embodiments, the hydrophobically modified polymers of the present invention may be present in the treatment fluids in an amount sufficient to provide the desired level of inhibition of shale swelling. Even further, in some embodiments, the hydrophobically modified polymers may be present in the treatment fluids of the present invention in an amount in the range of from about 0.02% to about 10% by weight of the treatment fluid. Even further, in certain exemplary embodiments, the hydrophobically modified polymers may be present in the treatment fluids of the present invention in an amount in the range of from about 0.05% to about 1% by weight of the treatment fluid.

In some embodiments, the treatment fluids of the present invention comprise a hydrophilically modified polymer. In some embodiments, the shale-inhibiting components of the present invention comprise a hydrophilically modified polymer. The hydrophilically modified polymers used in the present invention typically have a molecular weight in the range of from about 100,000 to about 10,000,000. In some embodiments, the hydrophilically modified polymers are water-soluble. In an exemplary embodiment, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymers may be a reaction product of a hydrophilic polymer and a hydrophilic compound. The hydrophilic polymers suitable for forming the hydrophilically modified polymers used in the present invention should be capable of reacting with hydrophilic compounds. In certain exemplary embodiments, suitable hydrophilic polymers include homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophilic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In another exemplary embodiment of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers such as, but not limited to, celluloses, chitosans, polyamides, polyetheramines, polyethyleneimines, polyhydroxyetheramines, polylysines, polysulfones, gums, and starches, and derivatives thereof. In an exemplary embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophilic compounds suitable for reaction with the hydrophilic polymers include, but are not limited to, polyethers comprising a halogens, sulfonates, sulfates, and organic acid derivatives. Examples of suitable polyethers include, but are not limited to, polyethylene oxides, polypropylene oxides, and polybutylene oxides, and copolymers, terpolymers, and mixtures thereof. In an exemplary embodiment, the polyether comprises an epichlorohydrin-terminated polyethylene oxide methyl ether.

The hydrophilically modified polymers formed from the reaction of a hydrophilic polymer and a hydrophilic compound may have estimated molecular weights in the range of from about 100,000 to about 10,000,000 and may have weight ratios of the hydrophilic polymers to the hydrophilic compounds in the range of from about 1:1 to about 10:1. Suitable hydrophilically modified polymers having molecular weights and weight ratios in the ranges set forth above include, but are not limited to, the reaction product of polydimethylaminoethyl methacrylate with epichlorohydrin-terminated polyethyleneoxide methyl ether; the reaction product of polydimethylaminopropyl methacrylamide with epichlorohydrin-terminated polyethyleneoxide methyl ether; and the reaction product of poly(acrylamide/dimethylaminopropyl methacrylamide) with epichlorohydrin-terminated polyethyleneoxide methyl ether. In an exemplary embodiment, the hydrophilically modified polymers comprise the reaction product of a polydimethylaminoethyl methacrylate with epichlorohydrin-terminated polyethyleneoxide methyl ether having a weight ratio of polydimethylaminoethyl methacrylate to epichlorohydrin-terminated polyethyleneoxide methyl ether of 3:1.

In some embodiments, the hydrophilically modified polymers of the present invention generally may be present in the treatment fluids in an amount sufficient to provide the desired level of inhibition of shale swelling. Even further, in some embodiments, the hydrophilically modified polymers may be present in the treatment fluids of the present invention in an amount in the range of from about 0.02% to about 10% by weight of the treatment fluid. Even further, in certain exemplary embodiments, the hydrophilically modified polymers may be present in the treatment fluids of the present invention in an amount in the range of from about 0.05% to about 1% by weight of the treatment fluid.

Additional additives may be added to the treatment fluids of the present invention as deemed appropriate by one skilled in the art for improving the performance of the treatment fluid with respect to one or more properties. Examples of such additives include, but are not limited to, emulsifiers, viscosifying agents, fluid loss control additives, salts, and weighting agents, and numerous other additives suitable for use in subterranean operations.

The treatment fluids of the present invention may be utilized for carrying out a variety of subterranean well treatments, including, but not limited to, drilling and completion operations. Treating a subterranean formation containing shales may include drilling a well bore in or near a portion of the subterranean formation. In certain exemplary embodiments, where the treatment fluids of the present invention are used with drilling operations, a drilling fluid that comprises a base fluid and a shale-inhibiting component of the present invention may be circulated into a well bore through the inside of a drill string, out through the drill bit, and up to the surface through the annulus between the drill string and the well bore. In some embodiments, the hydrophobically modified polymers and/or hydrophilically modified polymers may be added to a treatment fluid, inter alia, to reduce the tendency of shales to swell when exposed to the treatment fluid.

In some embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer that comprises a polymer backbone, the polymer backbone comprising polar heteroatoms, wherein the hydrophobically modified polymer does not comprise polyoxyethylene.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from a reaction of a hydrophilic polymer and a hydrophobic compound, wherein the hydrophilic polymer comprises a polyvinylamine, or a poly(vinylamine/vinyl alcohol).

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from a reaction of a hydrophilic polymer and a hydrophobic compound, wherein the hydrophilic polymer comprises a polymer backbone and contains reactive amino groups as pendant groups or in the polymer backbone.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophobically modified polymer formed from the polymerization reaction of at least one hydrophilic monomer and at least one hydrophobically modified hydrophilic monomer, wherein the hydrophilic monomer comprises N,N-dimethylacrylamide; vinyl pyrrolidone; dimethylaminoethyl methacrylate; dimethylaminopropylmethacrylamide; vinyl amine; vinyl acetate; trimethylammoniumethyl methacrylate chloride; hydroxyethyl acrylate; vinyl sulfonic acid; vinyl phosphonic acid; vinyl caprolactam; N-vinylformamide; N,N-diallylacetamide; dimethyldiallyl ammonium halide; styrene sulfonic acid; or a quaternary salt derivative of acrylamide.

In other embodiments, the present invention provides a method of stabilizing a subterranean formation that comprises a shale. The method comprises contacting the subterranean formation that comprises the shale with a treatment fluid, the treatment fluid comprising a base fluid, and a hydrophilically modified polymer.

In yet other embodiments, the present invention provides a shale-inhibiting component that comprises a hydrophobically modified polymer that comprises a polymer backbone, the polymer backbone comprising polar heteroatoms, wherein the hydrophobically modified polymer does not comprise polyoxyethylene.

In other embodiments, the present invention provides a shale-inhibiting component that comprises a hydrophobically modified polymer formed from a reaction of a hydrophilic polymer and a hydrophobic compound, wherein the hydrophilic polymer comprises a polyvinylamine, or a poly(vinylamine/vinyl alcohol).

In other embodiments, the present invention provides a shale-inhibiting component that comprises a hydrophobically modified polymer formed from a reaction of a hydrophilic polymer and a hydrophobic compound, wherein the hydrophilic polymer comprises a polymer backbone and contains reactive amino groups as pendant groups or in the polymer backbone.

In other embodiments, the present invention provides a shale-inhibiting component that comprises a hydrophobically modified polymer formed from the polymerization reaction of at least one hydrophilic monomer and at least one hydrophobically modified hydrophilic monomer, wherein the hydrophilic monomer comprises N,N-dimethylacrylamide; vinyl pyrrolidone; dimethylaminoethyl methacrylate; dimethylaminopropylmethacrylamide; vinyl amine; vinyl acetate; trimethylammoniumethyl methacrylate chloride; hydroxyethyl acrylate; vinyl sulfonic acid; vinyl phosphonic acid; vinyl caprolactam; N-vinylformamide; N,N-diallylacetamide; dimethyldiallyl ammonium halide; styrene sulfonic acid; or a quaternary salt derivative of acrylamide.

In other embodiments, the present invention provides a shale-inhibiting component that comprises a hydrophilically modified polymer.

To facilitate a better understanding of the present invention, the following examples of preferred embodiments are given. In no way should the following examples be read to limit, or define, the scope of the invention.

EXAMPLES

Shale erosion tests were performed on two different fluid samples, to determine the ability of the fluid samples to prevent shale from eroding in the presence of an aqueous medium. These tests were intended to mimic the exposure of drill cuttings to a particular drilling fluid during transport to the surface through a well bore annulus.

A sample of dried shale was ground and sieved through both a 6-mesh screen and a 14-mesh screen. U.S. Standard Sieve Series No. 6 and No. 14 screens were employed. Ground shale particles that pass through the 6-mesh screen but collected on the 14-mesh screen, e.g., particles of a size less than 6-mesh but greater than 14-mesh, were used for the shale erosion tests. For each fluid to be tested, a 40-gram sample of sized shale was weighed and selected. Next, the 40-gram sized shale sample was put into one laboratory barrel (350 ml) of each of the fluid samples. The fluid samples were then put into an oven and hot rolled at 150° F. for 16 hours. Next, the fluid samples were sieved through the 14-mesh screen and the retained solids were washed, dried, and weighed. The percent erosion was calculated based on the weight loss, corrected for the moisture content (7.67%) of the original sample. Table 1 below lists the shale erosion for each fluid tested.

TABLE 1

| Fluid Description | % Hydrophilically Modified Polymer | % Erosion |
|---|---|---|
| Fluid Sample No. 1 | 0% | 100 |
| Fluid Sample No. 2 | 1% | 33 |

Fluid Sample No. 1 comprised 100% deionized water. The shale erosion was 100%.

Fluid Sample No. 2 comprised deionized water and 1% of a hydrophilically modified polymer by weight of the deionized water. The hydrophilically modified polymer used was the reaction product of a polydimethylaminoethyl methacrylate with epichlorohydrin-terminated polyethyleneoxide methyl ether having a weight ratio of polydimethylaminoethyl methacrylate to epichlorohydrin-terminated polyethyleneoxide methyl ether of 3:1. The shale erosion was 33%.

Thus, this example indicates, inter alia, that Fluid Sample No. 2, which comprises a hydrophilically modified polymer of the present invention, provided improved shale erosion.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of stabilizing a subterranean formation that comprises shale comprising:
   contacting the subterranean formation that comprises the shale with a fluid, the fluid comprising:
   a base fluid, and
   a water soluble hydrophobically modified polymer formed from a reaction comprising a hydrophilic polymer and a hydrophobic compound, wherein the hydrophobically modified polymer formed from the reaction has a molecular weight in the range of about 100,000 to about 10,000,000, and comprises a polymer backbone that comprises polar heteroatoms and a hydrophobic branch that comprises an alkyl chain of about 4 to about 22 carbons without any intervening heteroatoms, wherein the hydrophobically modified polymer does not comprise polyoxyethylene, wherein the hydrophobic compound comprises an alkyl halide, a sulfonate, a sulfate, or an organic acid derivative and wherein the hydrophobically modified polymer contains reactive amino groups as pendant groups or in the polymer backbone.

2. The method of claim 1 wherein the fluid is a drilling fluid.

3. The method of claim 1 wherein the hydrophilic polymer is a homopolymer, a copolymer, or a terpolymer.

4. The method of claim 1 wherein the hydrophilic polymer comprises a cellulose, a chitosan, a polyamide, a polyetheramine, a polyethyleneimine, a polyhydroxyetheramine, a polylysine, a polysulfone, a gum, or a starch, or a derivative thereof.

5. The method of claim 1 wherein the hydrophilic polymer comprises a dialkyl amino pendant group.

6. The method of claim 1 wherein the hydrophilic polymer comprises a dimethyl amino pendant group and at least one monomer comprising dimethylaminoethyl methacrylate or dimethylaminopropyl methacrylamide.

7. The method of claim 1 wherein the organic acid derivative is selected from the group consisting of an octenyl succinic acid; a dodecenyl succinic acid; an anhydride of octenyl succinic acid, an ester octenyl of octenyl succinic acid, an amide of octenyl succinic acid, an anhydride of dodecenyl succinic acid, an ester of dodecenyl succinic acid, and an amide of dodecenyl succinic acid.

8. The method of claim 1 wherein the hydrophobically modified polymer is present in the fluid in an amount in the range of about 0.02% to about 10% by weight of the fluid.

9. The method of claim 1 wherein the hydrophilic polymer comprises an alkyl acrylate polymer.

10. The method of claim 1 wherein the hydrophilic polymer is selected from the group consisting of polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(acrylamide/dimethylaminopropyl methacrylamide), poly(2-acrylamido-2-methyl propane sulfonic acid/dimethylaminoethyl methacrylate), poly (acrylic acid/dimethylaminopropyl methacrylamide), and poly(methacrylic acid/dimethylaminopropyl methacrylamide).

11. The method of claim 1 wherein the hydrophilic polymer comprises polydimethylaminoethyl methacrylate.

12. The method of claim 1 wherein the hydrophobically modified polymer is the reaction product of an alkyl acrylate polymer and an alkyl halide.

13. A method of stabilizing a subterranean formation that comprises a shale comprising:
contacting the subterranean formation that comprises the shale with a fluid comprising:
a base fluid; and
a water soluble hydrophobically modified polymer formed from a reaction comprising a hydrophilic polymer and a hydrophobic compound, wherein the hydrophobically modified polymer formed from the reaction has a molecular weight in the range of about 100,000 to about 10,000,000 and comprises a polymer backbone and an amino pendant group quaternized to include a hydrophobic branch, wherein the hydrophobic branch comprises an alkyl chain of about 4 to about 22 carbons without any intervening heteroatoms, and wherein the hydrophobic compound comprises an alkyl halide, a sulfonate, a sulfate, or an organic acid derivative.

14. The method of claim 13 wherein the fluid is a drilling fluid.

15. The method of claim 13 wherein the hydrophilic polymer comprises a dimethyl amino pendant group and at least one monomer comprising dimethylaminoethyl methacrylate or dimethylaminopropyl methacrylamide.

16. The method of claim 13 wherein the hydrophilic polymer comprises polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), or poly(methacrylic acid/dimethylaminopropyl methacrylamide).

17. The method of claim 13 wherein the hydrophobic compound comprises an octenyl succinic acid; a dodecenyl succinic acid; an anhydride of octenyl succinic acid, an ester octenyl of octenyl succinic acid, an amide of octenyl succinic acid, an anhydride of dodecenyl succinic acid, an ester of dodecenyl succinic acid, or an amide of dodecenyl succinic acid.

18. The method of claim 13 wherein the hydrophobically modified polymer is present in the fluid in an amount in the range of about 0.02% to about 10% by weight of the fluid.

19. The method of claim 13 wherein the hydrophilic polymer comprises an alkyl acrylate polymer.

20. The method of claim 13 wherein the hydrophilic polymer is selected from the group consisting of polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(acrylamide/dimethylaminopropyl methacrylamide), poly(2-acrylamido-2-methyl propane sulfonic acid/dimethylaminoethyl methacrylate), poly (acrylic acid/dimethylaminopropyl methacrylamide), and poly(methacrylic acid/dimethylaminopropyl methacrylamide).

21. The method of claim 13 wherein the hydrophilic polymer comprises polydimethylaminoethyl methacrylate.

22. The method of claim 13 wherein the hydrophilic polymer comprises an alkyl acrylate polymer and the hydrophobic compound comprises an alkyl halide.

23. A method of stabilizing a subterranean formation that comprises a shale comprising:
contacting the subterranean formation that comprises the shale with a fluid comprising:
a base fluid; and
a water soluble hydrophobically modified polymer formed from a polymerization reaction comprising a hydrophilic monomer and a hydrophobically modified hydrophilic monomer, wherein the hydrophobically modified polymer formed from the reaction has a molecular weight in the range of about 100,000 to about 10,000,000, and comprises a polymer backbone and a hydrophobic branch comprising an alkyl chain of about 4 to about 22 carbons without any intervening heteroatoms, wherein the hydrophobically modified hydrophilic monomer comprises an alkyl halide, a sulfonate, a sulfate, or an organic acid derivative, and wherein the hydrophobically modified polymer contains reactive amino groups as pendant groups or in the polymer backbone.

24. The method of claim 23 wherein the hydrophilic monomer comprises N,N-dimethylacrylamide, vinyl pyrrolidone, dimethylaminoethyl methacrylate, dimethylaminopropylmethacrylamide, vinyl amine, vinyl acetate, trimethylammoniumethyl methacrylate chloride, hydroxyethyl acrylate, vinyl sulfonic acid, vinyl phosphonic acid, vinyl caprolactam, N-vinylformamide, N,N-diallylacetamide, dimethyldiallyl ammonium halide, styrene sulfonic acid, or a quaternary salt derivative of acrylamide.

25. The method of claim 23 wherein the fluid is a drilling fluid.

26. The method of claim 23 wherein the hydrophobically modified hydrophilic monomer comprises an alkyl acrylate, an alkyl methacrylate, an alkyl acrylamide, an alkyl methacrylamide, an alkyl dimethylammoniumethyl methacrylate halide, or an alkyl dimethylammoniumpropyl methacrylamide halide, wherein the alkyl groups have about 4 to about 22 carbon atoms.

27. The method of claim 23 wherein the hydrophobically modified polymer is present in the fluid in an amount in the range of about 0.02% to about 10% by weight of the fluid.

28. The method of claim 1 wherein the contacting the subterranean formation comprises drilling a well bore in the subterranean formation with the fluid.

29. The method of claim 13 wherein the contacting the subterranean formation comprises drilling a well bore in the subterranean formation with the fluid.

30. The method of claim 23 wherein the contacting the subterranean formation comprises drilling a well bore in the subterranean formation with the fluid.

31. The method of claim 1 wherein the polar heteroatoms present within the polymer backbone of the hydrophobically modified polymer comprise at least one heteroatom selected from the group consisting of: oxygen, sulfur, and phosphorous.

32. The method of claim 23 wherein the polymer backbone comprises polar heteroatoms.

33. The method of claim 32 wherein the polar heteroatoms present within the polymer backbone of the hydrophobically modified polymer comprise at least one heteroatom selected from the group consisting of: oxygen, sulfur, and phosphorous.

34. The method of claim 23 wherein the amino pendant group comprises a dialkyl amino pendant group.

* * * * *